(12) United States Patent
Bucey et al.

(10) Patent No.: US 6,308,409 B1
(45) Date of Patent: Oct. 30, 2001

(54) RECUPERATOR CELL ASSEMBLY SYSTEM

(75) Inventors: Charles W. Bucey, San Diego, CA (US); Doug R. Ervin, Metamora, IL (US); Bruce D. Harkins, Clearlake Shores, TX (US); Michael Nowak, St. Joseph, MI (US); Tod Papai, LaPorte, IN (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 09/305,430

(22) Filed: May 5, 1999

(51) Int. Cl.[7] ...................................................... B23P 15/26
(52) U.S. Cl. .................................. 29/890.034; 29/890.03
(58) Field of Search ........................ 29/890.034, 890.03; 165/166

(56) References Cited

U.S. PATENT DOCUMENTS

| | | | |
|---|---|---|---|
| 4,179,781 | 12/1979 | Long | 29/157.3 |
| 4,203,205 | 5/1980 | Jouet | 29/727 |
| 4,543,711 | 10/1985 | Wada et al. | 29/726 |
| 4,698,904 | 10/1987 | Nozawa et al. | 29/726 |
| 4,773,145 | * 9/1988 | Baker et al. | |
| 4,783,904 | 11/1988 | Kimura | 29/786 |
| 5,004,044 | 4/1991 | Horgan et al. | 165/145 |
| 5,060,721 | * 10/1991 | Darragh. | |
| 5,103,963 | 4/1992 | Sticht | 198/465.1 |
| 5,202,198 | 4/1993 | Mix et al. | 429/160 |
| 5,205,026 | 4/1993 | Sticht | 29/33 P |
| 5,426,847 | 6/1995 | Honma et al. | 29/726 |
| 5,918,368 | * 7/1999 | Ervin et al. | |
| 6,112,403 | * 9/2000 | Ervin et al. | |
| 6,158,121 | * 12/2000 | Ervin et al. | |
| 6,179,276 | * 1/2001 | Chen et al. | |

* cited by examiner

*Primary Examiner*—I Cuda Rosenbaum
(74) *Attorney, Agent, or Firm*—Larry G. Cain

(57) ABSTRACT

Recuperators include a core which is commonly constructed of a plurality of relatively thin flat sheets having an angled or corrugated spacer fixedly attached therebetween. The sheets are joined into cells, sealed and form passages between the sheets. These cells are stacked or rolled and form alternate air (recipient) cells and hot exhaust (donor) cells. Compressed discharged air from a compressor of the engine passes through the air cell while hot exhaust gas flows through alternate cells. The exhaust gas heats the sheets and the spacers, and the compressor discharged air is heated by conduction from the sheets and spacers. The need for repeatability of construction of each cell assures that the final recuperator is economically and easily assembled. Examples, of such repeatability required includes length, height, thickness, weld size, weld position, weld splatter and others. The recuperator assembly method provides a cell and a recuperator having repeatability of length, height, thickness, weld size, weld position, weld splatter and others.

41 Claims, 8 Drawing Sheets

RECUPERATOR CELL ASSEMBLY SYSTEM

TECHNICAL FIELD

This invention relates generally to an recuperator and more particularly to a cell of the recuperator and to a procedure for manufacturing the cell.

BACKGROUND ART

Many gas turbine engines use a heat exchanger or recuperator to increase the operating efficiency of the engine by extracting heat from the exhaust gas and preheating the combustion air. Typically, a recuperator for a gas turbine engine must be capable of operating at temperatures of between about 500 degrees C. and 800 degrees C. and internal pressures of between approximately 140 kPa and 1400 kPa under operating conditions involving repeated starting and stopping cycles.

Such recuperators include a core which is commonly constructed of a plurality of relatively thin flat sheets having an angled or corrugated spacer fixedly attached therebetween. The sheets are joined into cells, sealed and form passages between the sheets. These cells are stacked or rolled and form alternate air (recipient) cells and hot exhaust (donor) cells. Compressed discharged air from a compressor of the engine passes through the air cell while hot exhaust gas flows through alternate cells. The exhaust gas heats the sheets and the spacers, and the compressor discharged air is heated by conduction from the sheets and spacers. The need for repeatability of construction of each cell assures that the final recuperator is economically and easily assembled. Examples, of such repeatability required includes length, height, thickness, weld size, weld position, weld splatter and others.

An example of such a recuperator is disclosed in U.S. Pat. No. 5,060,721 issued to Charles T. Darragh on Oct. 29, 1991. In such a system, Darragh discloses a heat exchanger having been used to increase the efficiency of the engine by absorbing heat from that exhaust gases and transferring a portion of the exhaust heat to the combustion air. The heat exchanger is built-up from a plurality of performed involute curved cells stacked in a circular array to provide flow passages for the donor fluid and the recipient fluid respectively.

Thus, to economically and functionally produce such a recuperator, used with gas turbine engines, requires a process which insures an effective and repeatable procedure. For example, to assure the stacking of a fixed number of cell within a preestablished curricular configuration the height and thickness is extremely critical. To further insure the position and location or each cell within the recuperator structure, the position of individual passages within the cell needs to be accurate to insure for efficient functional operation.

The present invention is directed to overcoming one or more of the problems as set forth above.

DISCLOSURE OF THE INVENTION

In one aspect of the invention an automated method of manufacturing a cell is disclosed. The cell is adapted for use with a recuperator. The method of manufacturing is comprised of the following steps. Actuating a master control system. Actuating a work station control system. Actuating a first work station defining a first work position. Positioning a first donor bar in a first fixture designated as "A". A second work positioning a second donor bar in a second fixture designated as "B". A third work position positioning a sheet into the first fixture "A" and the second fixture "B". Each of the sheets having a recipient side being up. And, attaching the first donor bar and the second donor bar to the sheets forming a pair of cell portions. And, a fourth work position rotating a pair of cell portions and further attaching the sheets and the first donor bars. Actuating a second work station defining a first work position of the second work station. Transferring and rotating one of the pair of cell portions from the first fixture "A" of the fourth work position of the first work station to a first fixture "A'" of the first work position of the second work station and having the donor side of the sheet being up. Transferring the other one of the pair of cell portions from the second fixture "B" of the fourth work position of the first work station to a second fixture "B'" of the first work position of the second work station and having a recipient side of the sheet being up. A second work position of the second work station positioning a second recipient bar on the recipient side of the sheet in the second fixture "B'" and attaching the second recipient bar to the sheet. A third work position of the second work station positioning a first recipient bar on the recipient side of the sheet in the second fixture "B'". Positioning a pair of director sheets with the first recipient bar thereon on the recipient side of the sheet in the second fixture "B'" and further attaching the first recipient bar to the sheet. And, a fourth work position of the second work station positioning the cell portion from the first fixture "A'" to the second fixture "B'" with the donor side of the sheet being up and further attaching the cell portion from the first fixture "A'" to the cell portion of the second fixture "B'". Actuating a third work station defining a first work position of the third work station. Transferring the cell portion as welded from the second fixture "B'" of the fourth work position of the second work station into a second work position of the third work station and rotating the cell portion into a preestablished position. The second work position of the third work station fixedly attaching linearly along a portion of a bottom edge of the sheet and an entire length of the second recipient bar. A third work position of the third work station transferring and rotating the cell portion as fixedly attached from the second work position of the third work station to the third work position of the third work station. Forming the cell portion and fixedly attaching a pair of side edges of the sheet to the first recipient bar. A fourth work position of the third work station transferring and positioning the cell portion as fixedly attached to the fourth work position of the third work station fixedly attaching a top edge of the sheet and the first recipient bar. And, a fifth work position of the third work station staging the cell portion as fixedly attached. And, actuating a fourth work station defining a first work position of the fourth work station. Transferring the cell portion from the fifth work position of the third work station to a second work position of the fourth work station. The second work position of the fourth work station testing a leakage of the cell portion. The first work position of the fourth work station further transferring the cell portion as tested to a third work position of the fourth work station. Attaching a director sheet to the donor side of the sheet. The first work position of the fourth work station further transferring the cell as completed to a fourth work position of the fourth work station unloading the cell.

In another embodiment of the invention, a cell is formed of a plurality of individual components being produced by an automated process and being adapted for use with a recuperator. The cell is comprised of a pair of performed sheets defining a donor side and a recipient side. A plurality of donor bars are attached to the donor side of the pair of performed sheets. A plurality of recipient bars are attached to the recipient side of the pair of performed sheets. A donor side director sheet is in contacting relationship with the donor side of at least one of the pair of performed sheets. A recipient side director sheet is in contacting relationship with the recipient side of at least one of the pair of performed sheets. And, the pair of performed sheets, the plurality of donor bars and the plurality of recipient bars being fixedly attached one to another forming the cell.

BEST MODE FOR CARRYING OUT THE INVENTION

Figure 1:
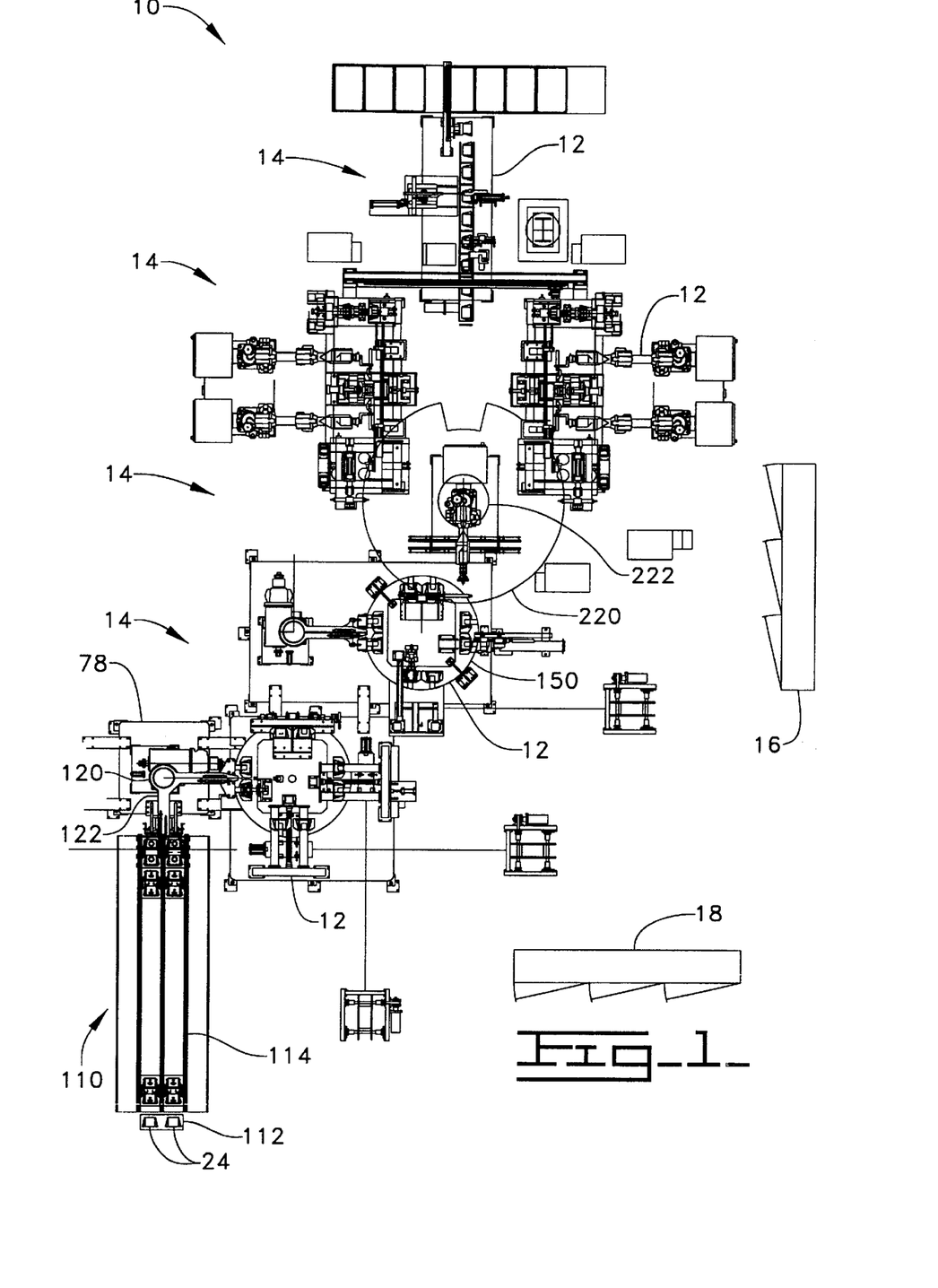
FIG. 1 is a top view of the assembly apparatus embodying the present invention.

Referring to FIG. 1, an assembly process or an automated method 10 is shown. The assembly process 10 includes a plurality of work stations 12 being interconnected. Each of the plurality of work stations 12 accomplish a plurality of preestablished tasks 14. Each of the plurality of work stations 12 and the tasks 14 are preestablishly controlled by a master control system 16 of conventional construction. The master control system 16 is divided into a plurality of work station control systems 18.

Figure 2:
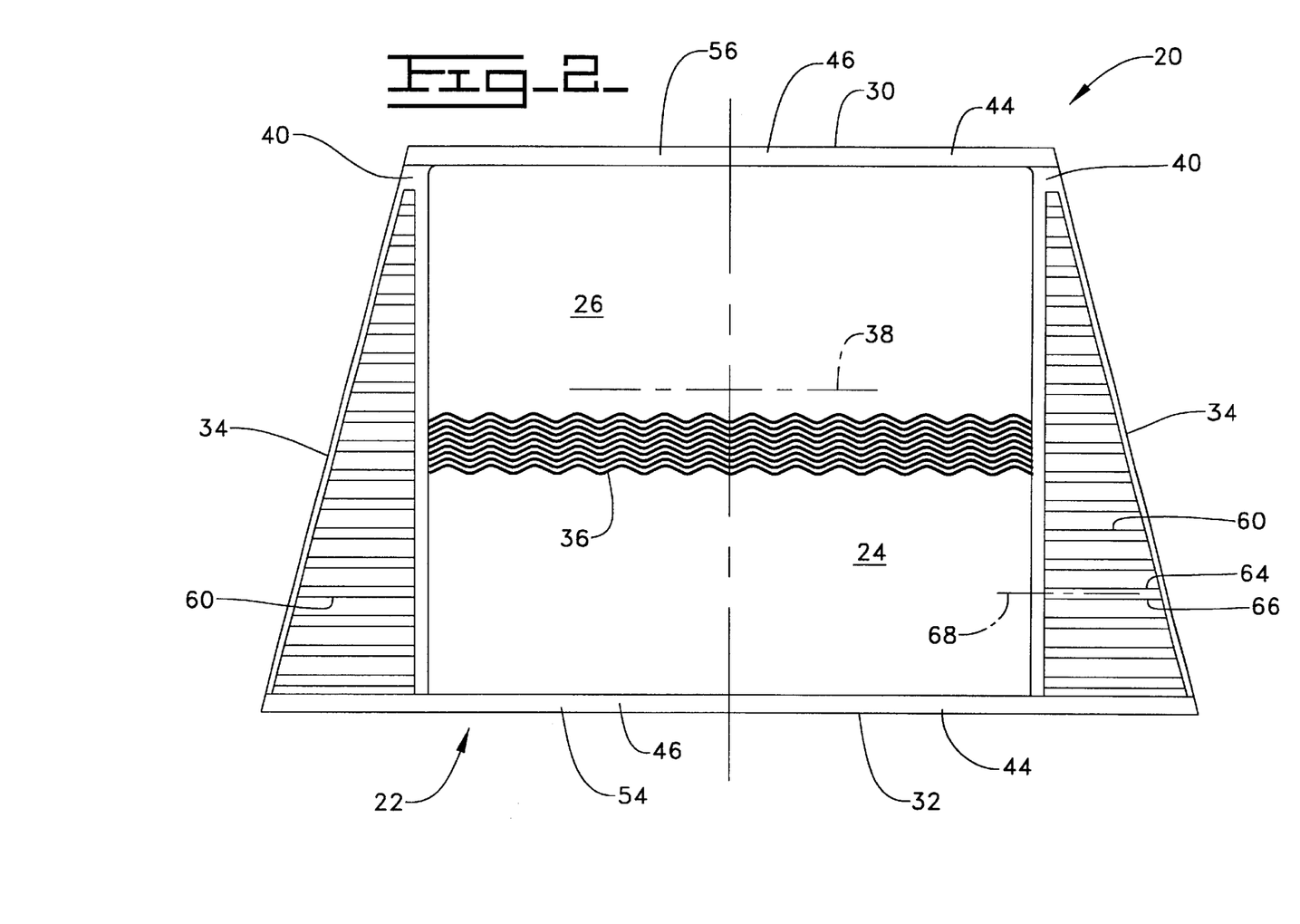
FIG. 2 is a view take through a cell looking at a donor side of a sheet used in making up a recuperator as is embodied in the present invention.
Figure 3:
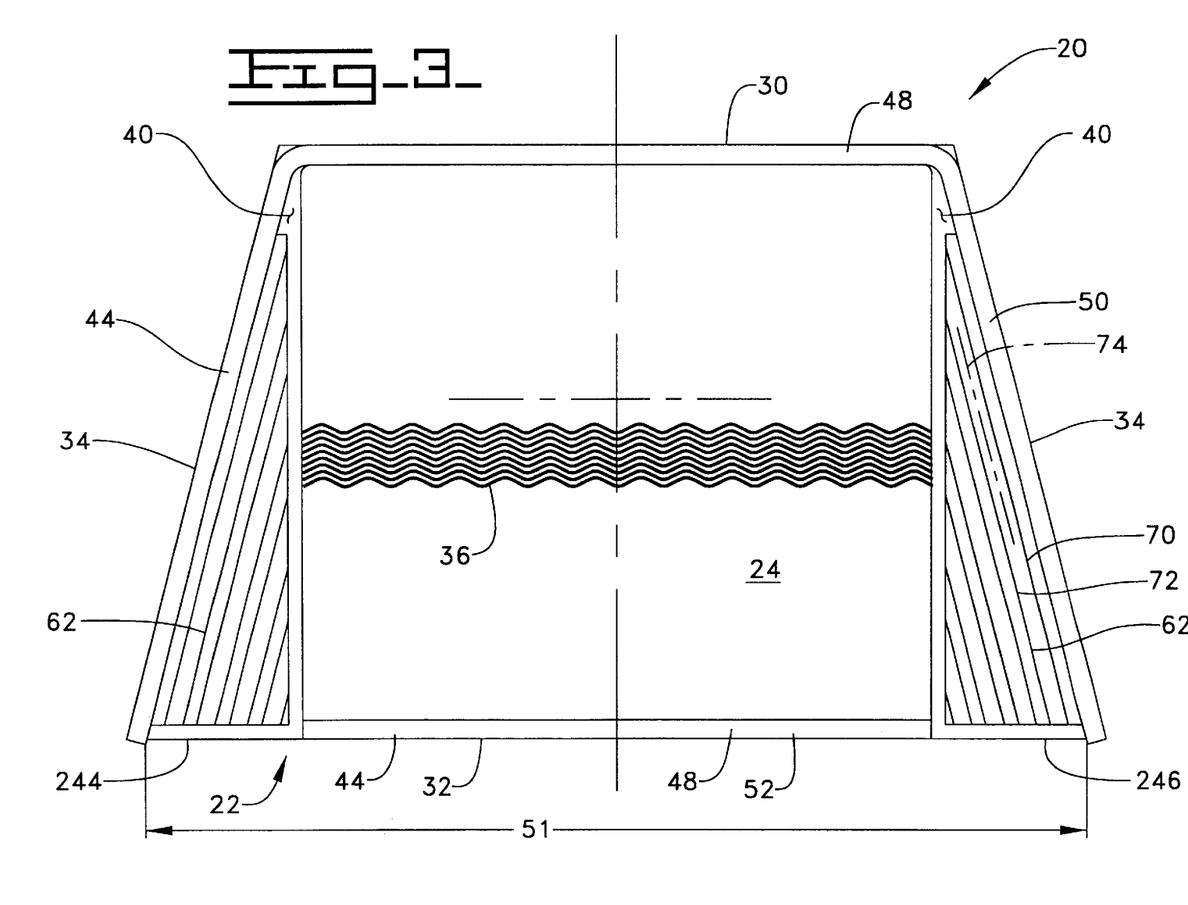
FIG. 3 is a view taken through a cell looking at a recipient side of the sheet use in making up the recuperator as is embodied in the present invention.
Figure 4:
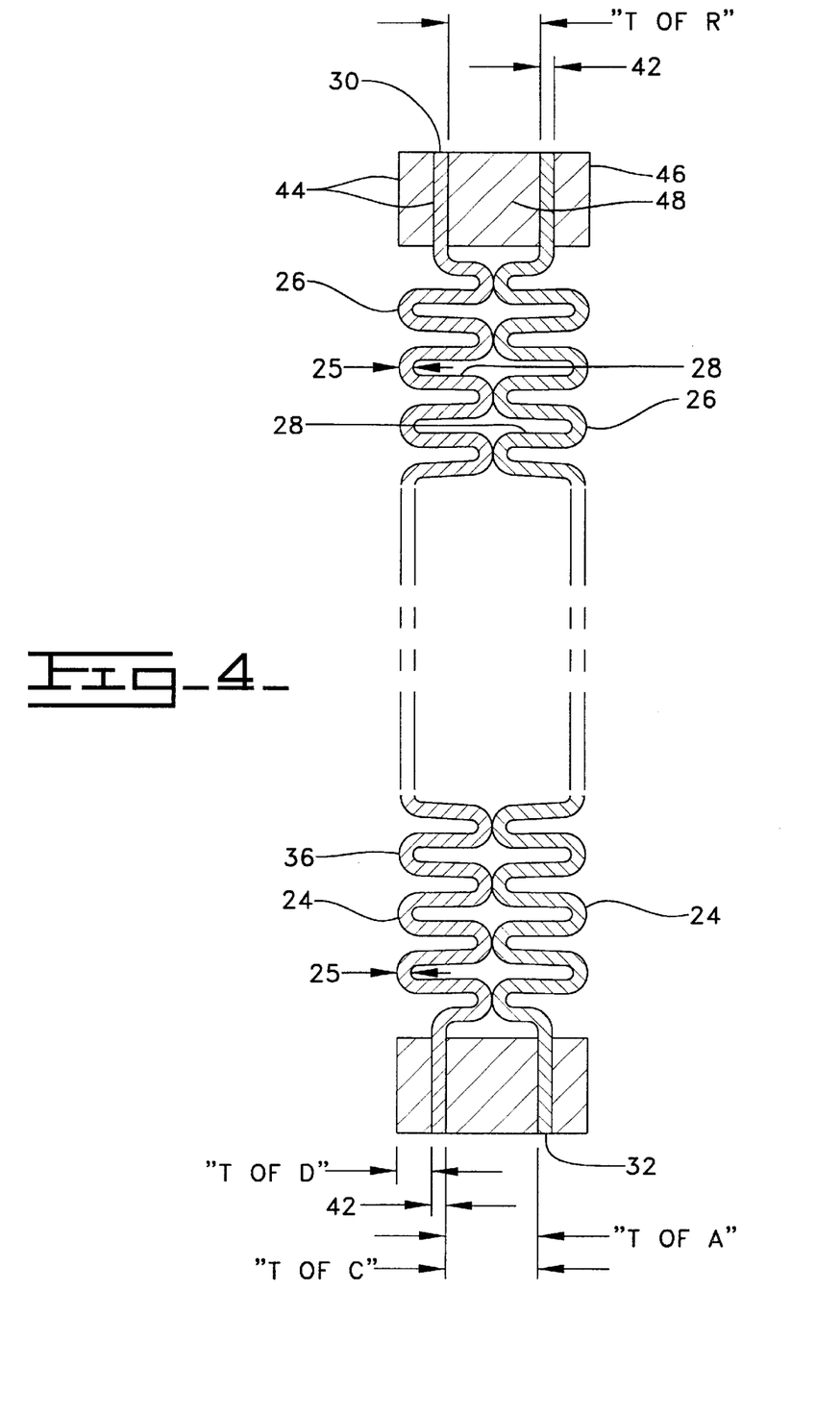
FIG. 4 is a sectional view of a cell used in making up a recuperator as is embodied in the present invention.

Referring to FIGS. 2, 3 and 4, a cell or work piece 20 is shown and includes a plurality of components or parts 22. For example, a portion of the plurality of parts 22 includes a pair of performed sheet 24 defining a thickness 25, a first or donor or gas side 26, a second or recipient or air side 28. The performed sheet 24 defines a bottom edge 30, a top edge 32 and a pair of side edges 34. The performed sheet 24 further includes a serpentined portion 36. As an alternative, the sheet 24 could be dimpled or have another configuration rather than being serpentined. Additionally, the sheet 24 has a trapezoidal configuration but could be of other configurations, such as a parallelogram or square or rectangular. In this application, the serpentined portion 36 has a generally rectangular configuration and is positioned between the top edge 32 and a portion of the bottom edge 30. As and alternative the serpentined portion 36 could be of other configurations, such as a parallelogram or square or triangle or a trapezoidal. The serpentined portion 36 defines an axis 38. The performed sheet 24 further includes a pair of flattened portions 40. In this application, each of the pair of flattened portions 40 have a generally triangular configuration. However, as an alternative the pair of flattened portions 40 could be singular, or of another configuration, such as a square, a rectangle or a parallelogram. Each of the pair of flattened portions 40 extends from the serpentined portion 36 to the respective one of the pair of sides 34 and a portion of the top edge 32 and a portion of the bottom edge 30. In this application, a portion of the serpentined portion 36 is also flattened along each of the top edge 32 and the bottom edge 30. The flattened portions 40 along each of the top edge 32 and the bottom edge 30 define a preestablished or substantial thickness 42.

As further shown in FIGS. 2 and 3, a plurality of spacer bars 44 are used to form the cell 20 and are positioned upon the performed sheet 24 in a preestablished order and position. In this application, the plurality of spacer bars 44 are divided into a plurality of donor bars 46 and a plurality of recipient bars 48. A preestablished thickness or substantial thickness "T of D" is defined for each of the plurality of donor bars 46 and a preestablished thickness or substantial thickness "T of R" is defined for each of the plurality of recipient bars 48. In this application, the plurality of donor bars 46 define a preestablished thickness, a preestablished width and a preestablished length. Furthermore, the plurality of recipient bars 48 have a preestablished thickness, a preestablished width and a preestablished length. The preestablished length of individual ones of the plurality of donor bars 46 and the plurality of recipient bars 48 have different lengths. The preestablished width of the individual ones of the plurality of donor bars 46 and the plurality of recipient bars 48 have generally the same width. However, as an alternative, the width or thickness of the plurality of donor bars 46 and the plurality of recipient bars 48 could be of various preestablished thicknesses or widths of the same thickness or width without changing the jest of the invention. And, the individual ones of the plurality of donor bars 46 have a thickness being about one-half of the thickness of the plurality of recipient bars 48. In this application, a first recipient bar 50 of the plurality of recipient bars 48 has a generally "U" configuration being formed by a base, a pair of legs and having an open end 51. As an alternative, the first recipient bar 50 could be segmented to include the base and the pair of legs. A second recipient bar 52 of the plurality of recipient bars 48 has a length being generally equal to that of the length of the serpentined portion 36 along the bottom edge 30. The plurality of donor bars 46 has a first donor bar 54 being generally equal to the length of the bottom edge 32 and a second donor bar 56 being generally equal to the length of the top edge 30 of the performed sheet 24.

Also used to construct the cell 20 is a pair of donor side director sheets 60 and a pair of recipient side director sheets 62. The donor side director sheets 60 define a plurality of alternating root portions 64 and crest portions 66. In this application, the plurality of root portions 64 and the crest portions 66 of the donor side director sheet 60 form an axis 68 which is axially aligned with the axis 38 of the serpentined portion 36. The recipient side director sheets 62 also define a plurality of alternating root portions 70 and crest portions 72. In this application, the plurality of root portions 68 and the crest portions 72 of the recipient side director sheets 62 form an axis 74 which is generally parallel to the respective one of the pair of side edges 34.

Figure 5:
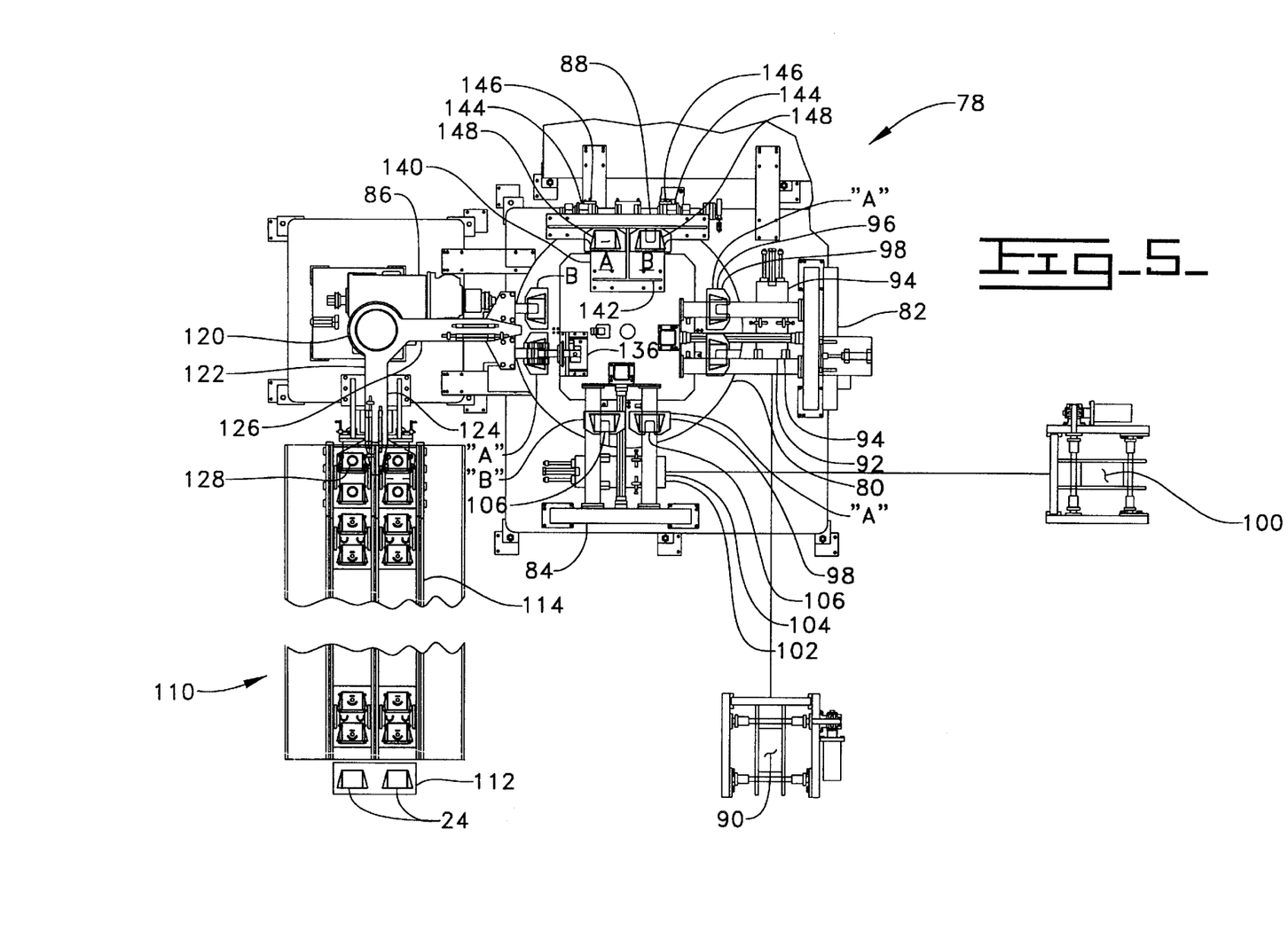
FIG. 5 is an enlarged view of a portion of the assembly apparatus, a first work station, embodied in the present invention.

As further shown in FIG. 1, the plurality of work stations 12 include a first work station 78, as best shown in FIG. 5. The first work station 78 includes a four position rotary indexer unit 80 defining a first work position 82, a second work position 84, a third work position 86 and a fourth work position 88. The unit 80 is indexable between the various work position 82,84,86,88.

In the first work position 82 of the first work station 78, a first roll of steel stock 90 is positioned in line with a straightening device 92. A pair of press assemblies 94 cuts the steel stock 90 into individual ones of the plurality of donor bars 46 having the preestablished length. The first donor bars 54 are positioned in a first fixture 96 of a pair of two nest fixture assemblies 98, designated as "A" and "B",in a conventional manner.

In the second work position 84 of the first work station 78, a second roll of steel stock 100 is positioned in line with a straightening device 102. A pair of press assemblies 104 cuts the steel stock 100 into individual ones of the plurality of donor bars 46 having the preestablished length. The second donor bars 56 are positioned in a second fixture 106 of the pair of two nest fixture assemblies 98, designated as "A" and "B" in a conventional manner. Each of the two nest fixture assemblies 98 further include two micarata plates which incorporate electrodes and copper bus bars in a conventional manner.

As further shown in FIGS. 1 and 5, the assembly process 10 includes a transportation system 110, which in this application, has a pallet 112 upon which a predetermined number of performed sheets 24 are located and positioned in a pair of stacks. A sheet gauge, not shown, is used to qualify each of the performed sheets 24 prior to being positioned on the pallet 112. A sheet lifting assembly, not shown, is positioned under the pallet 112. The performed sheets 24 are placed on a conveyer 114 in a pair of rows in a conventional manner. The performed sheets 24 are also placed on the conveyer in a predetermined pattern as will be explained latter.

In this application, the transfer of the performed sheets 24 from the conveyer 114 to the four position rotary indexer unit 80 is accomplished by a rotary part handler 120 that incorporates a tooled arm 122. The performed sheets 24 have the recipient side 28 up. The tooled arm 122 is rotatable from a first position 124, being aligned with the pair of rows of performed sheets 24 on the conveyer 114, to a second position 126, being aligned with each of the two nest fixture assemblies, "A" and "B",at the third work position 86 of the first work station 78. The tooled arm 122 includes a vacuum tool 128 which has been adapted for this application. Other types of tools, such as magnets or suction cups could be uses without changing the jest of the invention. At the third work position 86 of the first work station 78, an independent resistance weld assembly 136 or tack welding operation will be used to tack the performed sheet 24 to the first donor bar 54 and to the second donor bar 56.

And, at the fourth work position 88 of the first work station 78, an indexing fixture 140 rotates the portion of the cell 20. A water cooled gripper assembly 142 holds the performed sheet 24 and the first donor bar 54 in a fixed position with the bottom edge 30 of the performed sheet 24 up. A pair of seamer units 144 having a pair of weld torches 146, which in this application are of a plasma weld type, form a sealed weld between the first donor bar 54 and the performed sheet 24 generally along the pair of flattened portions 40 having the triangular configuration. The first work station 78 produces a pair of cell 20 portions or components 148 in a side by side operation.

Figure 6:
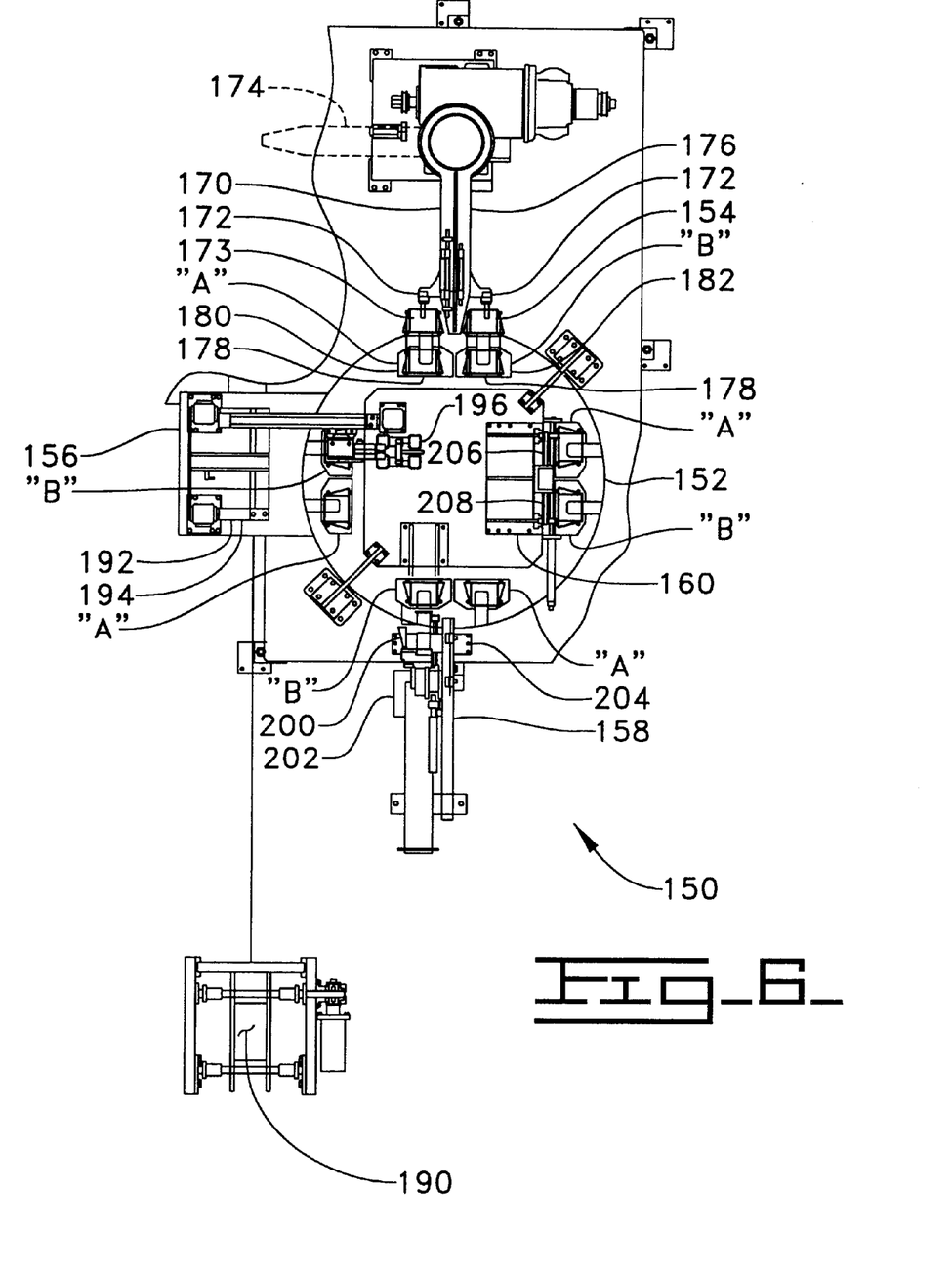
FIG. 6 is an enlarged view of a portion of the assembly apparatus, a second work station, embodied in the present invention.

As further shown in FIG. 1, the plurality of work stations 12 include a second work station 150, as best shown in FIG. 6. The second work station 150 includes a four position rotary indexer unit 152 defining a first work position 154, a second work position 156, a third work position 158 and a fourth work position 160. The unit 152 is indexable between the various work position 154, 156, 158, 160.

In the first work position 154 of the second work station 150, the transfer of the cell 20 portion, including the performed sheet 24 and the plurality of donor bars 46, is performed by a rotary part handler 170 that incorporates a pair of tooled arms 172 using a vacuum tool 173. The pair of tooled arms 172 are rotatable from a first position 174, as shown in phantom, being aligned with each of the pair of two nest fixture assemblies 98 designated as "A" and "B" of the fourth work position 88 of the first work station 78, to a second position 176, being aligned with a pair of two nest fixture assembly 178 positioned in the first work position 154 of the second work station 150. A first fixture 180 of the pair of two nest fixture assemblies 178 is designated as "A'" and a second fixture 182 of the pair of two nest fixture assemblies 178 is designated as "B'". Each of the pair of two nest fixture assembly 178 further includes two micarata plates which incorporate electrodes and copper bus bars of conventional construction. One of the pair of tooled arms 172 also rotates the cell portion 20 to position the donor side 26 up in the second fixture 182 designated as "B'" whereas the cell portion 20 positioned in the first fixture 180 designated as "'A" is positioned with the recipient side 28 up. The pair of tooled arms 172 include the vacuum tool 173 which has been adapted for this application. Other types of tools, such as magnets or suction cups could be uses without changing the jest of the invention.

In the second work position 156 of the second work station 150, a third roll of steel stock 190 is positioned in line with a straightening device 192. A press assembly 194 cuts the steel stock 190 into individual ones of the plurality of recipient bars 48 having the preestablished length. The second recipient bar 52 is positioned on the recipient side 28 of the performed sheet 24 along the flattened portion of the bottom edge 30 between the pair of flattened portions 40 in a conventional manner. The second recipient bar 52 is only placed in the second fixture 182 designated as "B'" of the pair of two nest fixture assemblies 178. The first fixture 180 of the pair of two nest fixture assemblies remains void of the second recipient bar 52. Further at the second work position 156 of the second work station 150, an independent resistance weld assembly 196 will be used to tack the performed sheet 24 to the second recipient bar 52.

In the third work position 158 of the second work station 150, the first recipient bar 50, being formed in the "U" configuration, with the recipient side director sheets 62 attached thereto are loaded into a gravity feed rack assembly 200. The first recipient bar 50 and the recipient side director sheets 62 are passed through a gage 202 to insure proper dimensional control prior to being positioned on the recipient side 28 of the performed sheet 24. The first recipient bar 50 and the recipient side director sheets 62 are positioned within the pair of flattened portions 40 and along the flattened portion of the top edge 32 in a conventional manner. The first recipient bar 50 and the recipient side director sheets 62 is only placed in the second fixture 182 of the pair of two nest fixture assemblies 178 designated as "B'". The first fixture 180 of the pair of two nest fixture assemblies remains void of the first recipient bar 50 and the recipient side director sheet 62. After being located in the second fixture 182 of the pair of two 178 designated as "B'", an electrode assembly 204 is lowered to the second fixture 182. The electrode assembly 204 incorporates tooling that will justify the legs into the proper position, creating the correct sheet and bar gap. Two independent electrodes, not shown, of the electrode assembly 204 are lowered to the first recipient bar 50 and resistant tack welds the first recipient bar 50 to the performed sheet 24 near the open end 51.

In the fourth work position 160 of the second work station 150, the cell 20 portion, including the performed sheet 24 and the plurality of donor bars 46 which has been positioned in the first fixture 180 of the pair of two nest fixture assemblies 178 designated as "A'" is positioned on top of the cell 20 portion built-up within the second fixture 182 of the pair of two nest fixture assemblies 178 designated as "B'". A vacuum tool 206 is used to pick-up, locate and place the cell 20 portion from "A'" to "B'". And, a pair of independent electrode assemblies 208 are lowered to resistant tack weld the performed sheet 24 and the plurality of donor bars 46 to the performed sheet 24, the plurality of donor bars 46, the plurality of recipient bars 48 and the pair of recipient side director sheets 62. The tack weld takes place near the open end 51.

Figure 7:
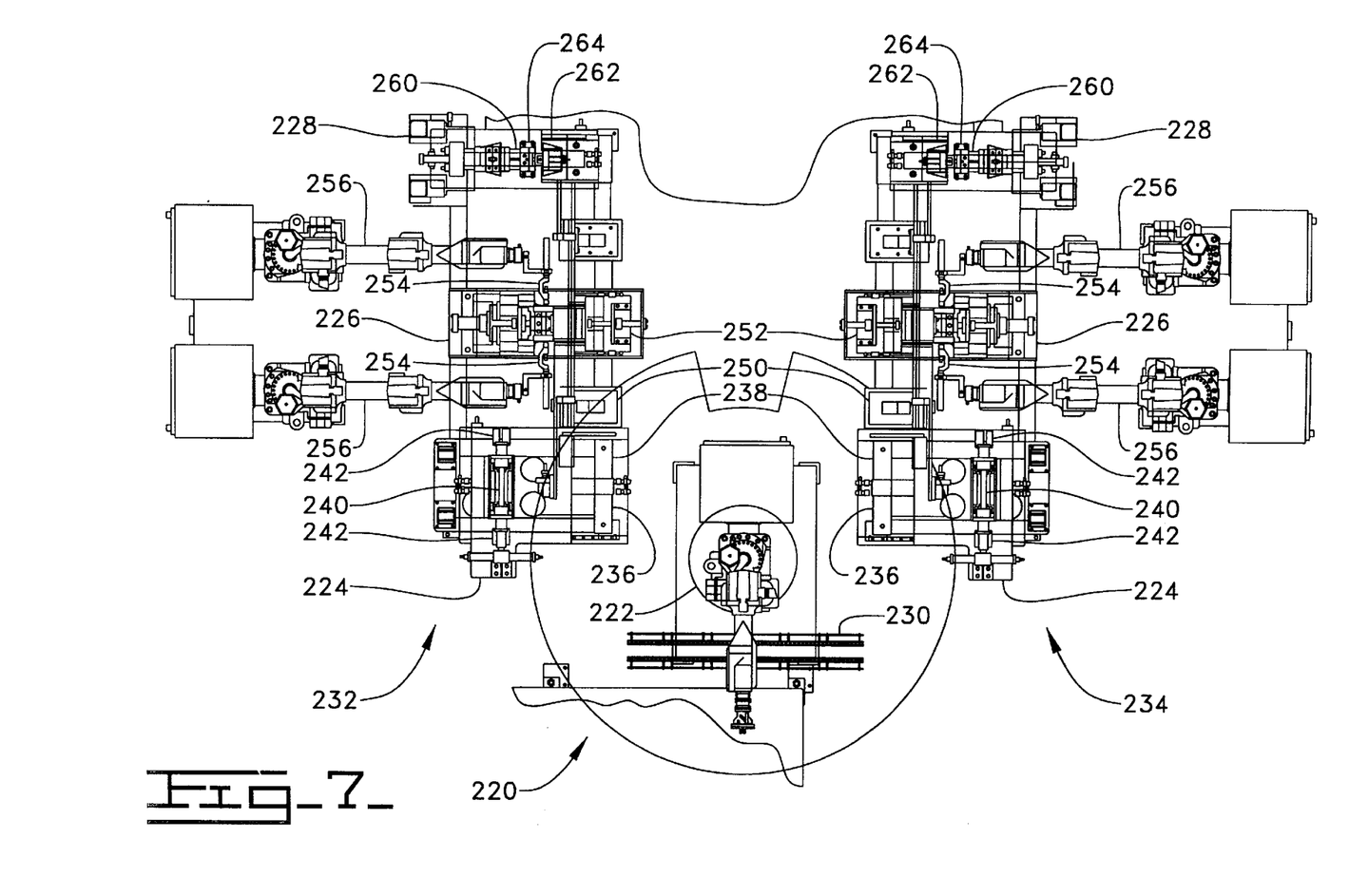
FIG. 7 is an enlarged view of a portion of the assembly apparatus, a third work station, embodied in the present invention.

As further shown in FIGS. 1 and 7, the plurality of work stations 12 include a third work station 220. The third work station 220 includes a first work position or robot unit 222, a pair of second work positions or first welding positions 224, a pair of third work positions or second welding positions 226, a pair of fourth work positions or third welding positions 228 and a fifth work position or staging unit 230. Individual ones of the pair of first welding positions 224, the pair of second weld positions 226 and the pair of third weld positions 228 are divided into two duplicate sides forming a first or left lane 232 and a second or right lane 234.

The robot unit 222 of the third work station 220 picks the tack welded cell 20 portion from the fourth work position 160 of the second work station 150 and positions the cell 20 portion into one of the pair of first weld positions 224. A second one of the cell 20 portion from the fourth work position 160 of the second work station 150 is placed in the other of the pair of first weld positions 224 by the robot unit 222. And, a third one of the cell 20 portion is placed into the staging unit 230 if the pair of first welding positions 224 are not available. The cell 20 portion is placed in the pair of first weld positions 224. A water cooled gripper assembly 236 holds the performed sheet 24 and the first donor bar 54 in a fixed position. A rotating mechanism 238 rotates the cell 20 portion to a preestablished position for welding. In this application, the bottom edge 30 of the performed sheets 24 is positioned up. A seam welder 240, which in this application, has a pair of torches 242. Each of the pair of torches 242 sealingly does half of the linear weld along a portion of the bottom edges 30 of the performed sheets 24 and the entire length of the second recipient bar 52. The remainder of the bottom edge 30 not being welded forms one of a recipient fluid inlet 244 or a recipient fluid outlet 246, as are best shown in FIG. 3.

A pick and place mechanism 250, being of conventional construction, will grasp the cell 20 portion from the respective one of the pair of first welding positions 224 and position the cell 20 portion in the second welding positions 226. The cell 20 portion is rotated and the bottom edges 30 and the second recipient bar 52 are placed in a forming fixture 252. The cell 20 portion has the top edges 32 of the performed sheets 24, the second donor bars 56 and the base portion of second recipient bar 52 facing up. The forming fixture 252 is used to hold and form the cell 20 portion into a preestablished configuration. The preestablished configuration is that of an involute in this application. To increase the life of the forming fixture 252, water cooling is incorporated. With the cell 20 portion formed in the involute configuration and held in position, a pair of welding torches 254 are positioned at the each of the pair of side edges 34 near the open end 51 of the first recipient bar 50. The pair of welding torches 254 sealingly does the welding of the respective pair of side edges 34 of the performed sheets 24 and the respective one of the pair of legs of the first recipient bar 50. The pair of welding torches 254 also weld the top and bottom corners. The welding torches 254 are attached to a robot 256 in a conventional manner.

The pick and place mechanism 250 will, at this time, grasp the cell 20 portion from the respective one of the pair of second welding positions 226 and position the cell 20 portion in the third welding position 228. In the each of third welding positions 228, the cell 20 portion has the top edges 32 of the performed sheets 24, the second donor bars 56 and the base portion of second recipient bar 52 facing up. Each of the third welding positions 228 incorporate a water cooled gripper 260. Furthermore, the third welding positions 228 have a slide system 262 positioned therein of conventional construction. The slide system 262 utilizes a pair of welding torches 264 attached thereto. Each of the pair of torches 264 sealingly does half of the linear weld along the top edges 32 of the performed sheets 24 and the base portion of the first recipient bar 50. Thus, a pair of cells 20, less the pair of donor side director sheets 60, are formed after the completion of the third work station 220.

Figure 8:
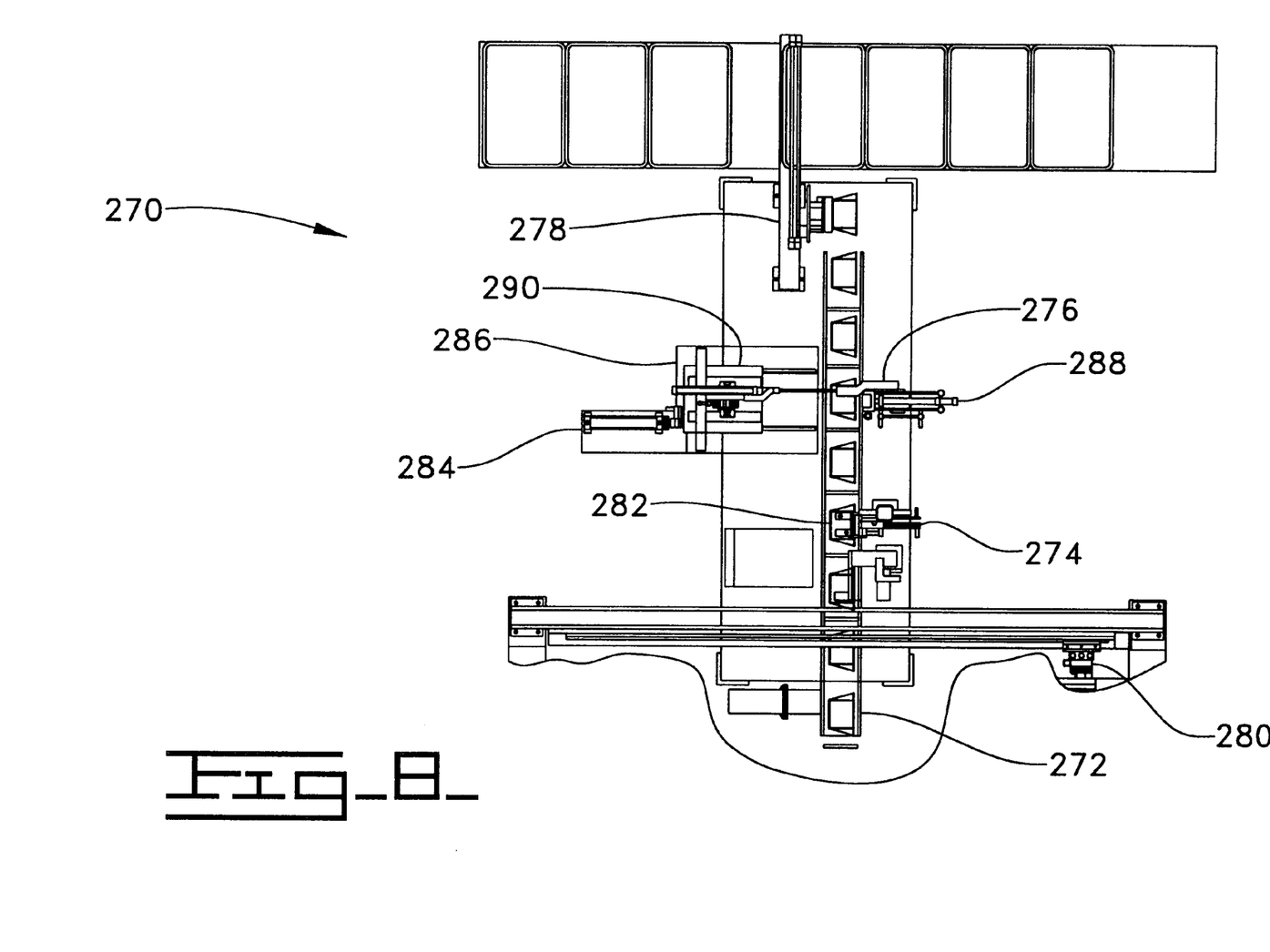
FIG. 8 is an enlarged view of a portion of the assembly apparatus, a fourth work station, embodied in the present invention.

As further shown in FIG. 1, the plurality of work stations 12 include a fourth work station 270. The fourth work station 270 includes a first work position or walking beam conveyor assembly 272 communicating with each of a second work positions or leak test position 274, a third work position or donor side director sheet position 276 and a fourth work positions or unloading position 278.

A servo driven pick and place assembly 280 is used to transferring the cell 20 portion which has been completely welded on the outer perimeter from the pair of third welding position 228 of the third work station 220 to the walking beam conveyor assembly 272. The cell 20 portion is indexed into the leak test position 274. A sealing tool assembly 282 is properly positioned on the cell 20 portion and a leak test procedure is performed. A vacuum of about 25 inches of mercury is pulled within the cell 20 to qualify the structure and functionality of the cell 20. If a cell 20 portion fails to qualify the cell 20 portion is removed from further operations at a reject unloading station 284. After the cell 20 portion has been qualified, it is transferred to the donor side director sheet position 276. In the donor side director sheet position 276, a forming tool 286 takes a precut sheet and forms the plurality of alternating root portions 64 and the crest portions 66. The forming tool 286 forms the pair of donor side director sheets 60 at the same time. Thus, the pair of donor side director sheets 60 are formed. An adhesive system 288 dispenses a thin line of adhesive to the donor side 26, in the flattened portions 40, of the performed sheets 24. With the adhesive applied to the donor side 26 of the sheet 60, a pick and place mechanism 290, picks and places the pair of donor side director sheets 60 on the donor side 26, in the flattened portions 40, of the performed sheets 24 in a preestablished position. Thus, the cell 20 is complete. From the donor side director sheet position 276, the cell 20 is transferred to the unloading position 278 and unloaded therefrom and transferred to a recuperator assembly area in a conventional manner, not shown.

The cell 20 being manufactured by the automated process or method 10 provides a cell 20 having a preestablished configuration and defining a preestablished thickness "T of C'". The automated process or method 10 provides an actual thickness "T of A" being within about plus or minus about "0.6 mm (0.025 inches)" of the preestablished thickness "T of C". And, with the automated welding processed used, the welding operation fails to increase the actual thickness "T of A".

Water cooling is used as necessary to increase life of the grippers, fixtures etc. A plasma welding process is used. And, a vacuum process is used for the pick-up and place operation. Furthermore, a spool de-coiling system along with a positive feed system is used with the rolls of steel stock. As an alternative, other welding processes, transferring processes and pick-up and place processes could be used without changing the essence of the invention.

INDUSTRIAL APPLICABILITY

In operation, the assembly process 10 is used for making a recuperator cell 20. The master control system 16 is activated and the plurality of work station control systems 18 are functionally operationable. The assembly process 10 begins with the first roll of steel stock 90 being positioned and passed through the straightening device 92. The steel stock 90 is cut into the preestablished length forming the first donor bar 54 and is placed in the portion of the nest fixture designated as "A". A second first donor bar 54 is also cut and placed in the portion of the nest fixture designated as "B" .

The indexer unit 80 of the first work station 78 is indexed and moved to the second work position 84. At the second work position 84, the second roll of steel stock 100 passed through the straightening device 92. The steel stock 90 is cut into the preestablished length forming the second donor bar 56 and is placed in the nest fixture designated as "A'". A second second donor bar 56 is also cut and placed in the nest fixture designated as "B'".

The indexer unit 80 is indexed and moved to the third work position 86. The performed sheets 24 having been communicated to the conveyer 114 are picked up by the vacuum tooling at the first position 124 of the rotary part handler 120, rotated and are properly positioned in the pair of nest fixtures 98 at the second position 126. The width of the first and second donor bars 54, 56 is in contacting relationship with the donor side 26. Furthermore, the first and second donor bars 54, 56 are respectively positioned in the flattened portion of the bottom edge 30 and the top edge 32. After the components have been positioned, the resistance weld assembly 136 is used to tack the individual first and second donor bars 54,56 and individual performed sheets 24 in each of the pair of nest fixtures 98. Each of the first and second donor bars 54, 56 have two points of resistance tack weld, additional points of resistance tack weld could be used.

The indexer unit 80 is indexed and moved to the fourth work position 88. At the fourth work position 88, the water cooled gripper assembly 124 grasps the work piece and the indexing fixture 140 rotates the performed sheets 24 and the tack welded plurality of donor bars 46 into the fixed position with the bottom edge 30 of the performed sheet 24 up. The pair of weld torches 146 of each of the seamer units 144 are positioned above the interface of the bottom edge 30 and the first donor bar 54 at the respective one of the flattened portions 40 of each cell 20 portion produced by "A" and "A'", and "B" and "B'". For example, one of the pair of weld torches 146 is positioned near one of the pair of sides 34. And, the other one of the pair of weld torches 146 is positioned near the serpentined portion 36. The pair of weld torches are activated by the appropriate one of the plurality of work station control systems 18 and the sealed weld is completed. The completed weld extends linearly from the each of the pair of sides 34 to the serpentined portion 36. In this application, the length of each weld is about 1⅝' or about 41.3 mm. Thus, the tasks 14 of the first work station 78 are completed.

The pair of tooled arms 172 of the rotary part handler 170 at the first position 174 pick the cell 20 portions from the fourth work position 88 of the first work station 78. And, the pair of tool arms 172 of the rotary part handler 170 are moved into the second position 176. Prior to positioning the cell 20 portions, one of the pair of tooled arms 172 is rotated and the cell portion 20 is positioned with the donor side 26 up in the second fixture 182 designated as "B".The cell portion 20 positioned in the first fixture 180 designated as "A" is positioned with the recipient side 28 up.

The indexer unit 152 of the second work station 150 is indexed and moved to the second work position 156. At the second work position 156, the third roll of steel stock 190 is passed through the straightening device 192. The steel stock 190 is cut into the preestablished length forming the second recipient bar 52 and is placed in the nest fixture designated as "B" along the flattened portion of the bottom edge 30 and is interposed the welds completed at the fourth work position 88 of the first work station 78. Additionally, the resistance well assembly 196 is positioned and tack welds the performed sheet to the second recipient bar 52. The performed sheet and the second recipient bar 52 are resistance tack welded in two places, additional points of resistance tack weld could be used.

The indexer unit 152 of the second work station 150 is indexed and moved to the third work position 158. At the third work position 158, the preassemblied first recipient bar 50 having the "U" configuration with the recipient side director sheets 62 attached thereto are passed through the gage 202 assuring uniformity of the final assembly. The preassemblied bar 50 and sheet 62 are positioned in the second fixture 178 designated as "B".The preassembly is positioned with the respective sheet 62 and leg in the respective one of the pair of flattened portions 40 and the base in the flattened portion along the top edge 32. The electrode assembly 204 is lowered and the first recipient bar 50 is resistance tack welded to the performed sheet 24. The resistance tack weld is completed in two places, additional points of resistance tack weld could be used. The two places being near the open end 51 of the first recipient bar 50.

The indexer unit 152 of the second work station 150 is indexed and moved to the fourth work position 160. At the fourth work position 160, the vacuum tool 206 picks the cell 20 portion from the second fixture 182 designated as "A", and locates and positions the cell 20 portion from "A" on top of the cell 20 portion within the first fixture 180 designated as "B". After being positioned, the pair of electrode assemblies 208 resistance tack weld the performed sheet 24 from "A" to the first recipient bar 50. The resistance tack weld is completed in two places, additional points of resistance tack weld could be used. The two places being near the open end 51 of the first recipient bar 50. Thus, the tasks 14 of the second work station 78 are completed.

The robot unit 222 of the third work station 220 picks the cell 20 portion from the fourth work position 160 of the second work station 150 and one of the plurality of station control systems 18 of the master control system 16 directs the robot unit 222 to place the cell 20 portion into the appropriate one of the pair of first weld positions 224. If each of the pair of first weld positions 224 is full, the master control system 16 will direct the robot unit 222 to place the cell 20 portion into the staging unit 230. The cell 20 portion is rotated by the rotating mechanism 238 to the preestablished position to be welded. The pair of torches 242 of the seam welder 240 are positioned along the bottom edge 30 of the performed sheets 24 and the entire length of the second recipient bar 52 is welded. One of the pair of torches 242 is positioned at the end of the second recipient bar 52 and the other one of the pair of torches 242 is positioned at a lineal distance half way along the length of the second recipient bar 52. As the pair of torches 242 slide and travel linearly along the length of the second recipient bar 52 the entire length of the second recipient bar 52 is sealingly welded. Each of the pair of torches 242 does half of the linear weld and the two welds are blendingly and sealingly connected near the center of the second recipient bar 52.

After being welded along the bottom edges 30 and the second recipient bar 52, the pick and placer mechanism 250 removes the cell 20 portion from the respective one of the pair of first welding positions 224. The cell 20 portion is positioned into the second welding position 226. The pick and place mechanism 250 prior to positioning the cell 20 portion into the second welding position 226 rotates the cell 20 portion. And, the bottom edge 30 of the performed sheets 24 is gripped by the forming fixture 252. The forming fixture 252 is actuated by the station control system 18 and the cell 20 portion is formed into the involute configuration. With the forming fixture 252 actuated, the station control system 18 directs the robots 256 to position the respective one of the pair of welding torches 254 to the intersection of the top edge 32 and the respective one of the pair of sides 34 And, the station control system 18 directs the pair of welding torches 254 to plasma weld each of the pair of sides 34. The welds sealingly connect the ends of the donor bars 46 near the bottom edges 30 of the performed sheets 24, the pair of sides 34 of the performed sheets 24, the ends of the donor bars 46 near the top edges 32 of the performed sheets 24 and the pair of legs of the first recipient bar 50.

After being formed and welded along the pair of sides 34, the pick and placer mechanism 250 removes the cell 20 portion from the respective one of the pair of second welding positions 226 and positions the cell 20 portion into the third welding position 228. The pick and place mechanism 250 positions the cell 20 portion with the top edges 32 of the performed sheets 24, the second donor bars 56 and the base portion of the first recipient bar 50 facing up. The station control system 18 directs the slide system 262 into place. For example, one of the pair of welding torches 264 is positioned at the intersection of the respective one of the pair of sides 34 and the top edge 32 of the performed sheets 24. And, the other one of the pair of torches 264 is positioned at a lineal distance half way along the length of the top edge 32 of the performed sheets 24. As the pair of torches 264 slide and travel linearly along the length of the top edge 32 the entire length of the top edges 32 of the performed sheets 24, the second donor bars 56 and the base portion of the first recipient bar 50 are sealingly welded. Each of the pair of torches 264 does half of the linear weld and the two welds are blendingly and sealingly connected near the center of the second recipient bar 52. Thus, the tasks 14 of the third work station 220 are completed.

The master control system 16 sends a signal to the appropriate one of the plurality of station control systems 18. The station control system 18 directs the servo driven pick and place assembly 280 of the fourth work station 270 to pick the cell 20 portion from the third welding position 228 of the third work station 220 and to place the cell 20 portion onto the walking beam conveyor assembly 272 of the fourth work station 270. The cell 20 portion passes along the walking beam conveyor assembly 272 and is indexed into the leak test position 274. With the cell 20 portion nested in the leak test portion 274, a sealing tool assembly 282 is positioned on the cell 20 portion. For example, the sealing tool assembly 282 is sealingly positioned about the recipient fluid inlet 244 and the recipient fluid outlet 246. And, a vacuum of about 25 inches of mercury is pulled within the cell 20 portion. If the cell 20 portion does not qualify the leak test, the walking beam conveyor assembly 272 moves the cell 20 portion to the reject unloading station 284 and the defective cell 20 portion is removed. If the cell 20 portion qualifies the leak test, the walking beam conveyor assembly 272 moves the cell 20 portion from the leak test position 274 to the donor side director sheet position 278. At the donor side director sheet position 276, the forming tool 286 takes the precut sheet and forms the plurality of alternating root portions 64 and crest portions 66. The thin line of adhesive is dispenses by the adhesive system 288 to the donor side 26, in the flattened portions 40, of the performed sheets 24. The pick and place mechanism 290 picks and places the pair of donor side director sheets 60 onto the donor side 26, in the flattened portions 40, of the performed sheets 24 in the preestablished position. Thus, the assembly process 10 for making the cell 20 is completed. And, the qualified cell 20 is unloaded from the assembly process 10 and is transferred to the recuperator assembly area.

The assembly process 10 produces an economical and functional process. The need for repeatability of construction of each cell 20 assures that the final recuperator is economically and easily assembled. Examples, of such repeatability required includes length, height, thickness, weld size, weld position, weld splatter and others. The steps and work stations produce a recuperator cell 20 which insures an effective and repeatable product. For example, the height and thickness insures that the position and location of each cell 20 within the recuperator structure enables the position of individual passages within the cell 20 to be accurate and provide efficient functional operations of the recuperator.

Other aspects, objects and advantages of this invention can be obtained from a study of the drawings, the disclosure and the appended claims.

What is claimed is:

1. An automated method of manufacturing a cell, said cell having a plurality of bars interposed a pair of sheets defining a passage between said pair of sheets, said cell being adapted for use with a recuperator; said method of manufacturing comprising the steps of:

actuating a master control system;

actuating a work station control system;

actuating a first work station defining a first work position of said first work station positioning a pair of first donor bars in a first fixture designated as "A", a second work position of said first work station positioning a pair of second donor bars in a second fixture designated as "B",a third work position of said first work station positioning one of said pair of sheets into each of said first fixture "A" and said second fixture "B", each one of said pair of sheets having a recipient side being up, and attaching said pair of first donor bars and said pair of second donor bars to each of said pair of sheets forming a first pair of cell portions, one of each first pair of cell portions being in said first fixture "A" and in said second fixture "B", and a fourth work position of said first work station rotating each of said first pair of cell portions and further attaching each of said pair of sheets and said pair of first donor bars;

actuating a second work station defining a first work position of said second work station transferring and rotating one of said first pair of cell portions from said first fixture "A" of said first work station at said fourth work position to a first fixture "A'" of said second work station at said first work position, a donor side of said one of said pair of sheets being up and transferring said other one of said first pair of cell portions from said second fixture "B" of said first work station at said fourth work position to a second fixture "B'" of said second work station at said first work position, said recipient side of said one of said pair of sheets being up, a second work position of said second work station positioning a recipient bar on said recipient side of said one of said pair of sheets in said second fixture "B'" and attaching said recipient bar to said one of said pair of sheets, a third work position of said second work station positioning an other recipient bar on said recipient side of said one of said pair of sheets in said second fixture "B'", positioning a pair of director sheets on said recipient side of said one of said pair of sheets in said second fixture "B'" and further attaching said other recipient bar to said one of said pair of sheets, and a fourth work position of said second work station positioning said first pair of cell portions from said first fixture "A'" to said second fixture "B'" with said donor side of said one of said pair of sheets being up and further attaching said first pair of cell portions from said first fixture "A'" to said first pair of cell portions of said second fixture "B'" forming a second pair of cell portions;

actuating a third work station defining a first work position of said third work station, transferring and storing said second pair of cell portions from said second fixture "B'" at said second work station at said fourth work position, a second work position of said third work station, rotating said second pair of cell portions into a preestablished position, said third work station at said second work position fixedly attaching a portion of a bottom edge of said pair of sheets and an entire length of said recipient bar, a third work position of said third work station transferring and rotating said second pair of cell portions as fixedly attached from said third work station at said second work position to said third work station at said third work position and fixedly attaching a pair of side edges of said pair of sheets to said recipient bar, a fourth work position of said third work station transferring and positioning said second pair of cell portions as fixedly attached at said third work station at said fourth work position and fixedly attaching a top edge of said pair of sheets and said recipient bar and a fifth work position of said third work station staging said second pair of cell portions as fixedly attached forming a cell; and actuating a fourth work station defining a first work position of said fourth work station, transferring and storing said cell from said third work station at said fifth work position, a second work position of said fourth work station testing a leakage within said passage of said cell, said fourth work station at said first work position further transferring said cell as tested to a third work position of said fourth work station, attaching a director sheet to said donor side of one of said pair of sheets, said fourth work station at said first work position further transferring said cell as completed to a fourth work position of said fourth work station unloading said cell.

2. The automated method of manufacturing the cell of claim 1 wherein said attaching includes a tack welding operation.

3. The automated method of manufacturing the cell of claim 1 wherein said actuating of said third work station at said third work position forming said second pair of cell portions includes said second pair of cell portions being formed into an involute configuration.

4. The automated method of manufacturing the cell of claim 1 wherein said actuating a fourth work station at said third work position attaching a director sheet to said donor side being gluingly attached.

5. The automated method of manufacturing the cell of claim 1 wherein each of said pair of sheets having a serpentined portion.

6. The automated method of manufacturing the cell of claim 5 wherein each of said pair of sheets further having a flattened portion.

7. The automated method of manufacturing the cell of claim 1 wherein said first work station at said first work position positioning said pair of first donor bars in said first fixture designated as "A" including a first roll of steel stock being straightened and cut to a preestablished length.

8. The automated method of manufacturing the cell of claim 1 wherein said second work station at said first work position positioning said pair of second donor bars in said fixture designated as "B" including a second roll of steel stock being straightened and cut to a preestablished length.

9. The automated method of manufacturing the cell of claim 1 wherein said third work station at said first work position transferring, said sheet being transferred by a rotary part handler.

10. The automated method of manufacturing the cell of claim 9 wherein said rotary part handler using a vacuum tool.

11. The automated method of manufacturing the cell of claim 1 wherein said first work station at said third work position attaching said pair of first donor bars and said pair of second donor bars to said pair of sheets being a tack welding operation.

12. The automated method of manufacturing the cell of claim 1 wherein said first work station at said fourth work position further includes welding said pair of sheets and said pair of first donor bars includes a sealed weld between said pair of first donor bars and said pair of sheets generally along a pair of flattened portions of said pair of sheets.

13. The automated method of manufacturing the cell of claim 1 wherein said second work station at said first work position transferring and rotating being transferred and rotated by a rotary part handler.

14. The automated method of manufacturing the cell of claim 9 wherein said rotary part handler using a vacuum tool.

15. The automated method of claim 1 wherein said second work station at said second work position positioning said recipient bar including a third roll of steel stock being straightened and cut to a preestablished length.

16. The automated method of claim 1 wherein said second work station at said second work position attaching said recipient bar being a tack welding operation.

17. The automated method of claim 1 wherein said second work station at said third work position positioning said other recipient bar including said first recipient bar having a recipient side director sheet attached thereto.

18. The automated method of claim 17 wherein said second work station at said third work position positioning said other recipient bar including said other recipient bar having a second recipient side director sheet attached thereto.

19. The automated method of claim 1 wherein said second work station at said third work position positioning said other recipient bar including said pair of sheets having a flattened portion along a top edge and a pair of flattened portions and said other recipient bar being positioned in said flattened portion along said top edge and said pair of flattened portions.

20. The automated method of claim 1 wherein said second work station at said third work position welding said other recipient bar being a tack welding operation.

21. The automated method of claim 20 wherein said second work station at said third work position attaching said other recipient bar and said tack welding operation being near an open end of said other recipient bar.

22. The automated method of claim 1 wherein said second work station at said fourth work position positioning said second pair of cell portions from said first fixture "A'" to said second fixture "B'" being positioned by a vacuum tool.

23. The automated method of claim 1 wherein said second work station at said fourth work position attaching said one of said second pair of cell portions from said first fixture "A'" to said second fixture "B'" being a tack welding operation.

24. The automated method of claim 1 wherein said third work station at said first work position transferring said one of said second pair of cell portions from said second fixture "B'" of said second work station at said fourth work position includes said third work station at said second work position being transferred by a robot unit.

25. The automated method of claim 1 wherein said third work station at said second work position includes a pair of said second work positions.

26. The automated method of claim 1 wherein said third work station at said second work position fixedly attaching said bottom edge of said pair of sheets and said entire length of said recipient bar, said fixedly attaching being a weld and said weld being by a seam welder having a pair of torches.

27. The automated method of claim 1 wherein said third work station at said third work position includes a pair of said third work positions.

28. The automated method of claim 1 wherein said third work station at said fourth work position including said second pair of cell portions being placed in a forming fixture having said top edge of said pair of sheets, the pair of second donor bars and the base portion of said recipient bar facing up.

29. The automated method of claim 1 wherein said third work station at said third work position fixedly attaching said pair of side edges including a pair of welding torches each welding a respective one of said pair of side edges.

30. The automated method of claim 29 wherein said welding said pair of side edges including welding a top and a bottom corner.

31. The automated method of claim 1 wherein said third work said fourth work position includes a pair of said fourth work positions.

32. The automated method of claim 1 wherein said third work station at said fourth work position fixedly attaching said top edge of said pair of sheets and said recipient bar includes a slide system having a pair of welding torches.

33. The automated method of claim 32 wherein each of said pair of welding torches sealingly welds half of a linear weld along said top edge of said pair of sheets and a base portion of said recipient bar.

34. The automated method of claim 1 wherein said third work station at said fifth work position and said fourth work station at said second work position transferring said second pair of cell portions includes a servo driven pick and place assembly.

35. The automated method of claim 34 wherein said servo driven pick and place assembly transferring said cell onto a walking beam conveyor assembly.

36. The automated method of claim 1 wherein said fourth work station at said second work position testing includes a sealing tool assembly.

37. The automated method of claim 36 wherein said sealing tool assembly includes actuating a vacuum of about 635 mm (25 inches) of mercury through said cell.

38. The automated method of claim 1 wherein said fourth work station at said third work position includes forming a precut sheet defining a plurality of alternating root portion and crest portion making said director sheet.

39. The automated method of claim 38 wherein said forming said precut sheet includes using a forming tool.

40. The automated method of claim 1 wherein said fourth work station at said third work position includes a pair of director sheets being positioned in a pair of flattened portions.

41. The automated method of claim 1 wherein said fourth work station at said third work position includes an adhesive system dispersing an adhesive to said donor side of said pair of sheets.

* * * * *